Nov. 30, 1943.   F. EHRSAM   2,335,497
IMPLEMENT AND METHOD OF MAKING SAME
Filed Dec. 11, 1942   7 Sheets-Sheet 1
Fig. 1.    Fig. 2.
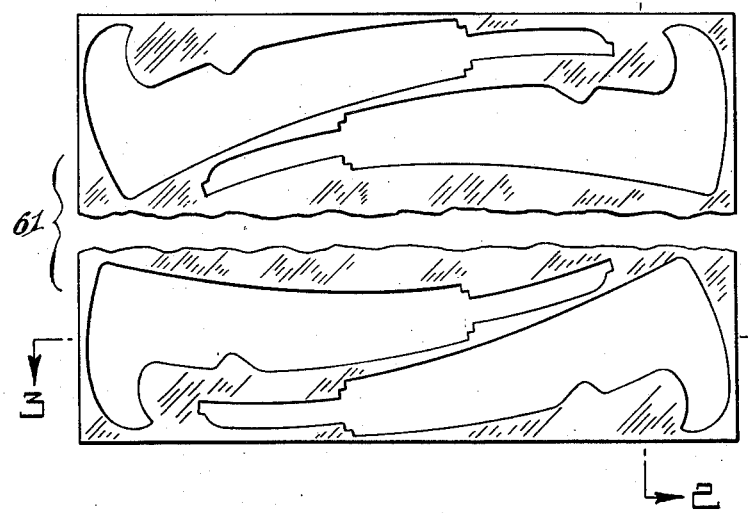
Fig. 3.
Fig. 4.
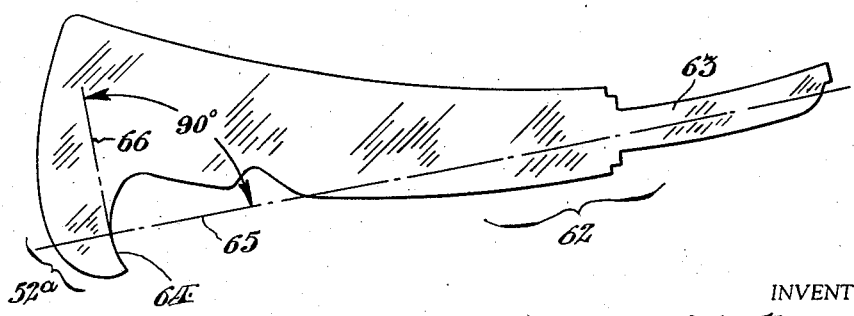
INVENTOR:
Frederick Ehrsam,
BY
ATTORNEY.

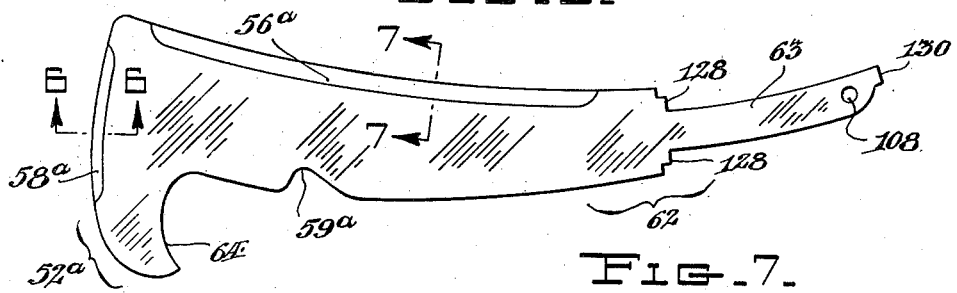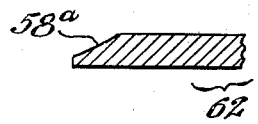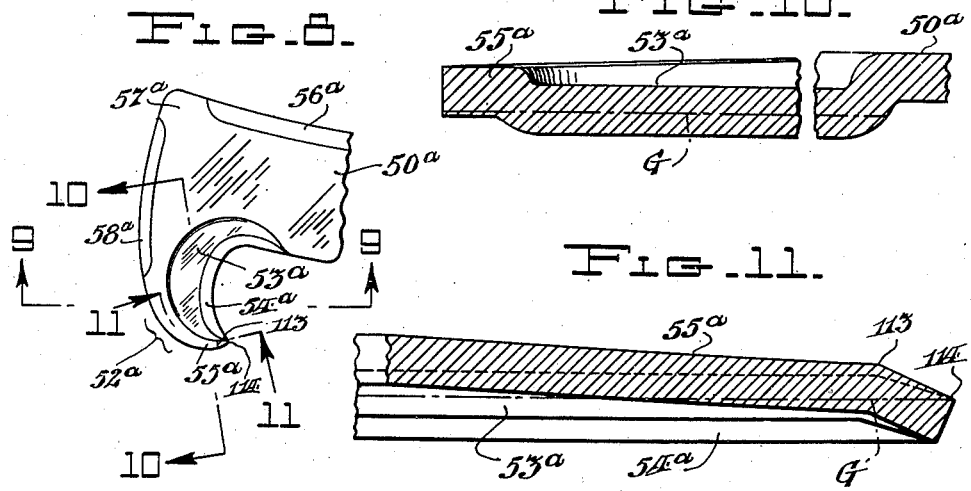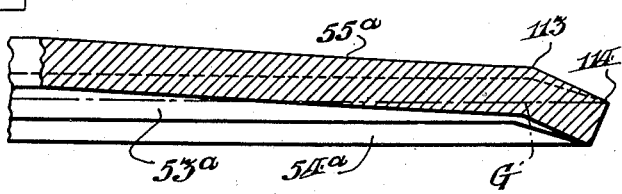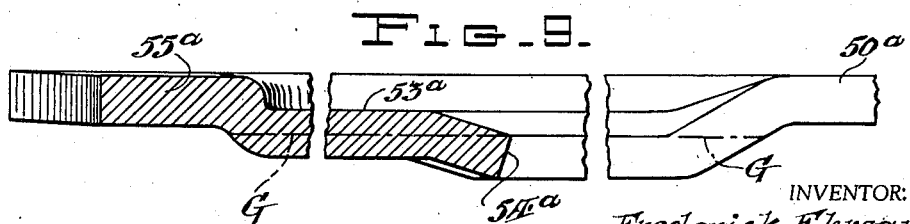

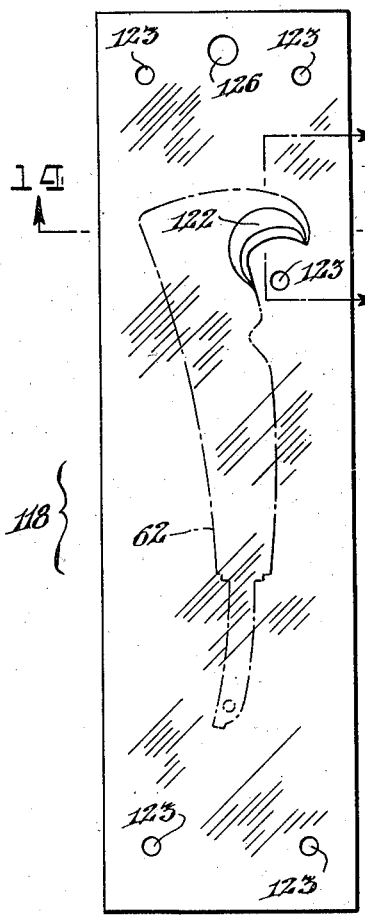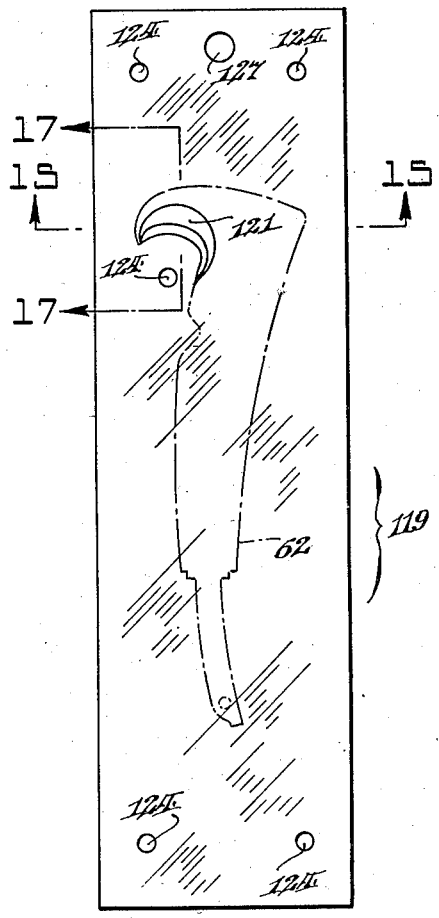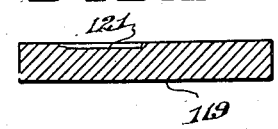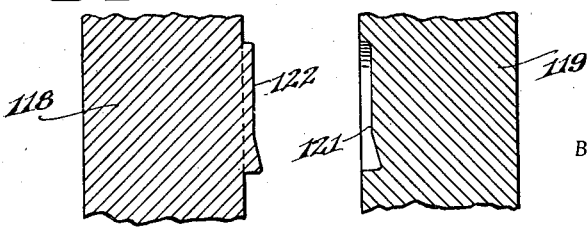
INVENTOR:
Frederick Ehrsam,
BY
ATTORNEY.

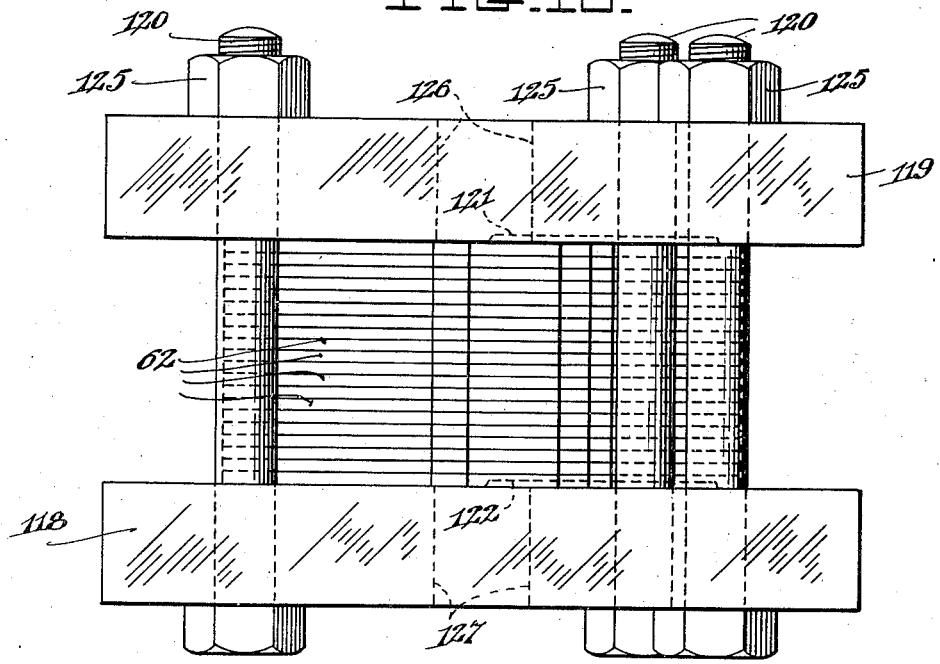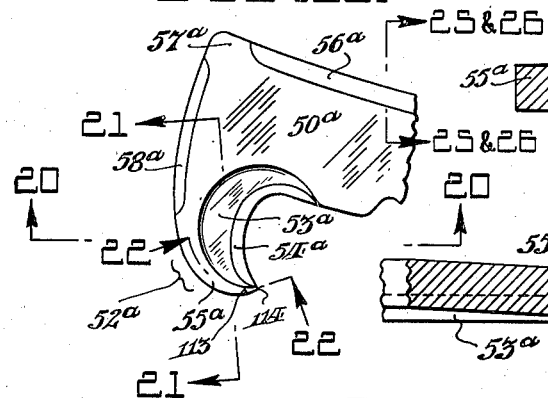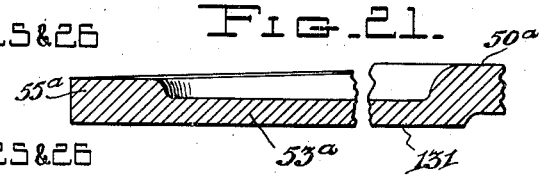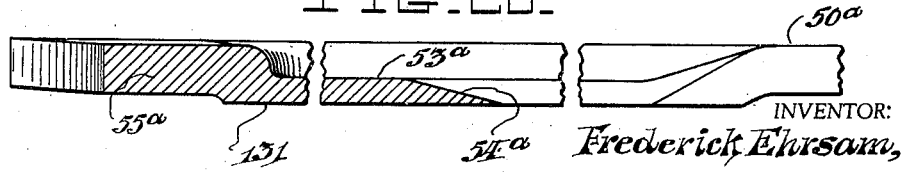

Nov. 30, 1943.  F. EHRSAM  2,335,497
IMPLEMENT AND METHOD OF MAKING SAME
Filed Dec. 11, 1942  7 Sheets-Sheet 5
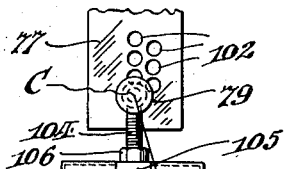
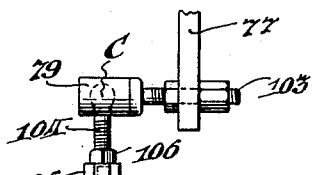
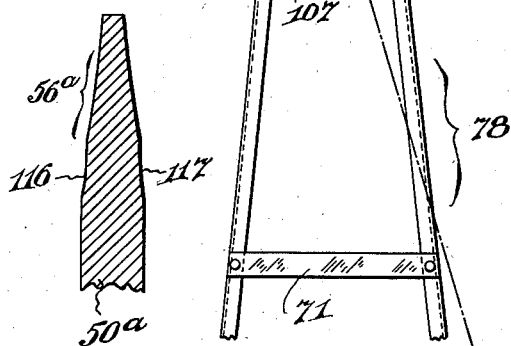
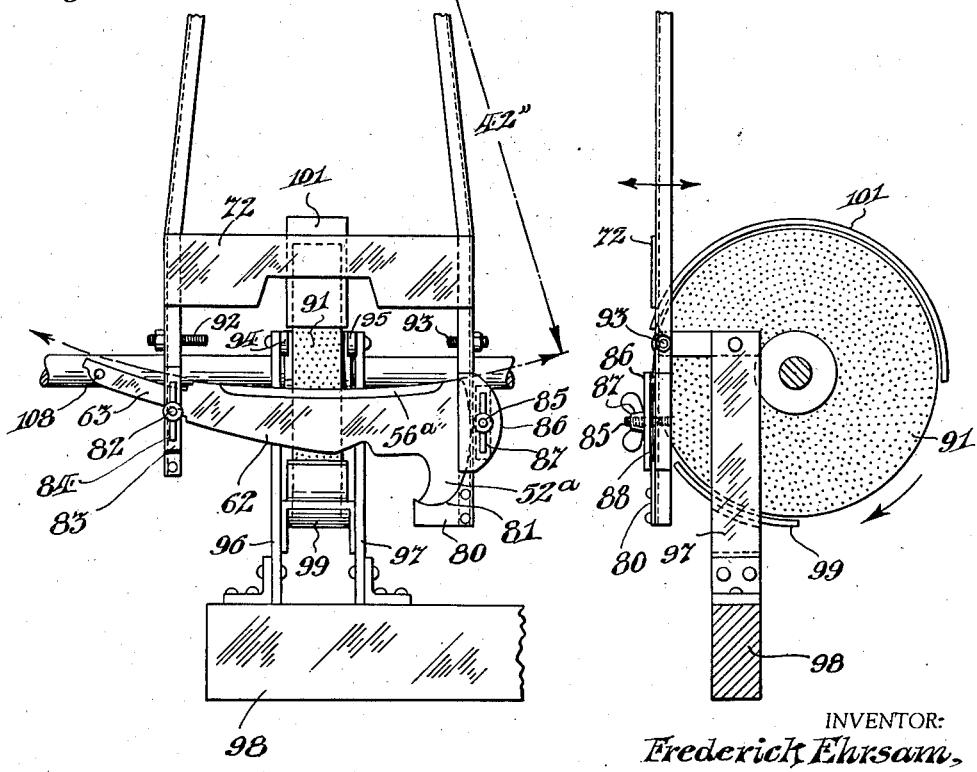
INVENTOR:
Frederick Ehrsam,
BY
ATTORNEY.

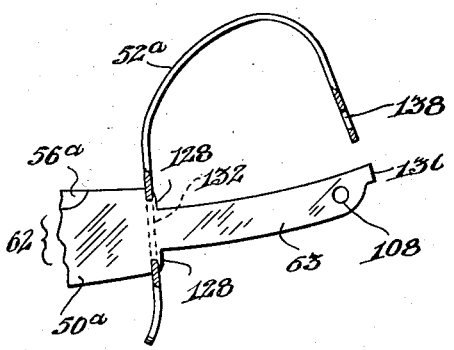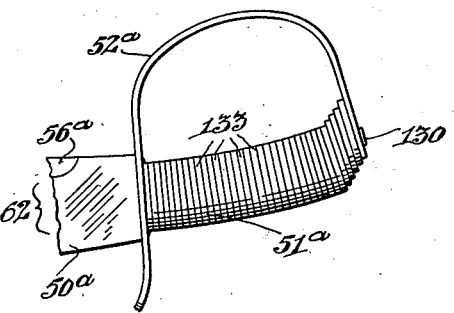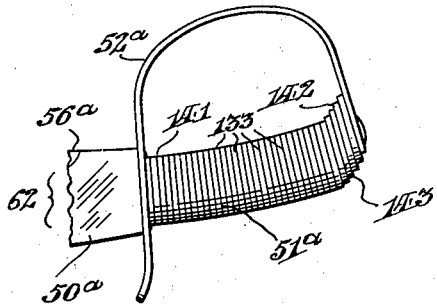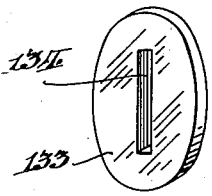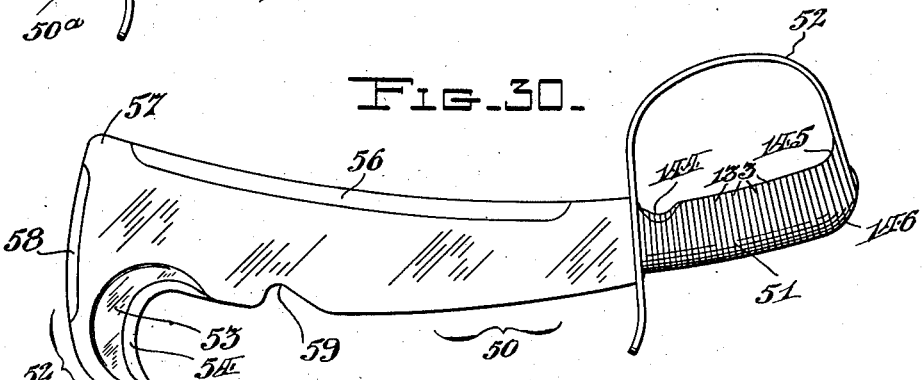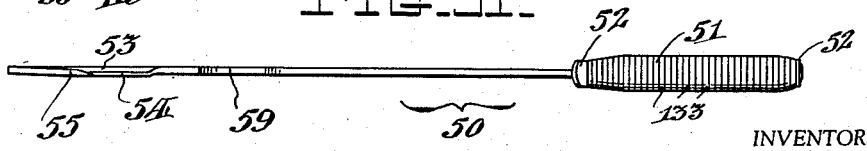

Nov. 30, 1943. F. EHRSAM 2,335,497
IMPLEMENT AND METHOD OF MAKING SAME
Filed Dec. 11, 1942 7 Sheets-Sheet 7
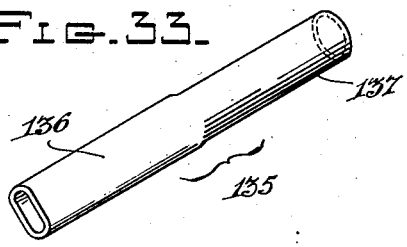
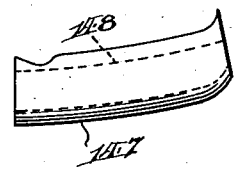
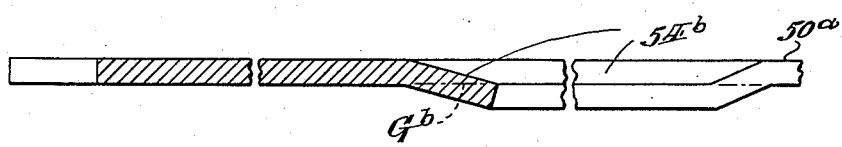
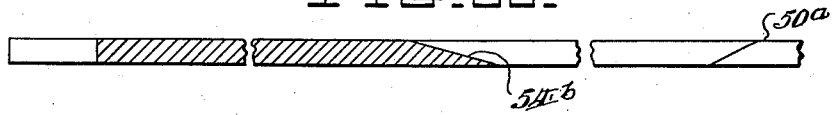
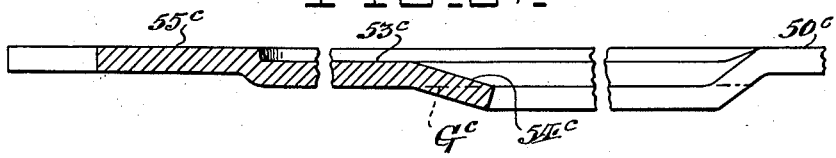
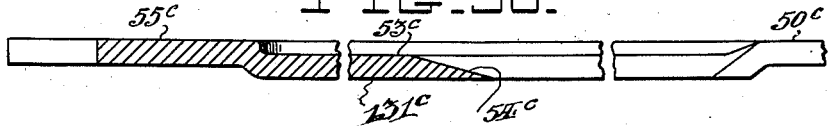
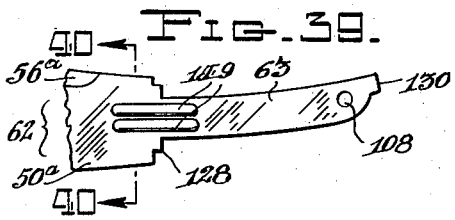
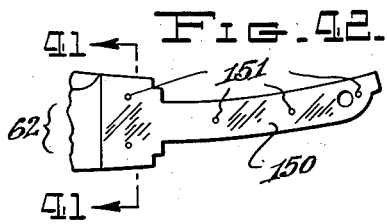
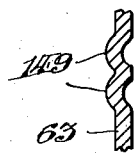
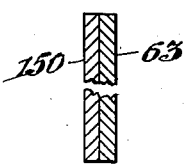
INVENTOR:
Frederick Ehrsam,
BY
ATTORNEY.

Patented Nov. 30, 1943

2,335,497

UNITED STATES PATENT OFFICE 2,335,497

IMPLEMENT AND METHOD OF MAKING SAME

Frederick Ehrsam, Reading, Pa.

Application December 11, 1942, Serial No. 468,867

20 Claims. (Cl. 30—165)

This invention concerns a manual implement particularly designed for use by woodmen, campers, soldiers, farmers and other individuals of this generally outdoor-active type, to enable them to quickly and efficiently perform certain tasks or activities, such as cutting or chopping off trees, branches, underbrush, cornstalks, etc., which implement is adapted for use as a weapon, as a ground digging tool, and embodies other utility features; and to a method of producing such an implement.

One object of my invention is to provide a new implement of the referred to type which is structurally and functionally superior to devices heretofore available for the indicated purposes.

Another object is to provide such an implement which can be readily manufactured from sheet or plate metal of uniform thickness.

A further object is the provision of such an implement which enables the easy performance of cutting operations close to the ground, between rocks, or similar places where the use of other cutting devices becomes more or less impractical.

An additional object is to provide such an implement having a cutting section arranged to effect a substantially right-angular cross-cutting action when the implement is moved in a line coextensive with the median line of the implement handle, so as to permit the exertion of undeflected straight-arm pulling force in connection with such cutting operations.

Another object is the provision of such an implement which is useful for emergency trench, or other ground digging operations, as carried out on certain occasions by soldiers and marines, and for this purpose can be held and manipulated with both hands without danger of injury from the cutting edges of the implement.

It is also an object to provide such an implement which can be advantageously used as a weapon.

Another object resides in the provision of such an implement with a relatively thin cutting blade structure having unique reinforcing features and functional advantages.

A still further object involves the production of such an implement by a new and advantageous method.

With these and other objects in view, which will become apparent from the following detailed description of various illustrative and practical embodiments of the implement, shown in the accompanying drawings, the invention resides in the novel elements, features of construction, arrangement of parts in cooperative relationship, and method of making the implement, as more particularly pointed out in the appended claims.

In the drawings:

Figure 1 is a plan view of a piece of steel plate, or sheet steel, of uniform thickness, from which the blank forms for the implement of my invention are stamped;

Fig. 2 is a cross-sectional view of the plate illustrated in Figure 1, taken substantially along the lines 2—2 of the latter;

Fig. 3 is a cross-sectional view of the plate illustrated in Figure 1, taken substantially along the lines 3—3 of the latter;

Fig. 4 is a plan view of one of the blank forms from which the implement of my invention is developed, as it appears after being stamped from the sheet metal plate illustrated in Figure 1;

Fig. 5 is a view similar to Fig. 4 and illustrates the appearance of the blank in one stage of its development;

Fig. 6 is an enlarged fragmentary cross-sectional view of the blank shown in Fig. 5, taken substantially as indicated by the arrows 6—6 of the latter;

Fig. 7 is an enlarged fragmentary cross-sectional view of the blank shown in Fig. 5, taken substantially as indicated by the arrows 7—7 of the latter;

Fig. 8 is a plan view of one end of the blank shown in Fig. 5 and illustrates the appearance thereof in a certain stage of its development;

Fig. 9 is a cross-sectional view as seen by looking in the direction of the arrows 9—9 in Fig. 8;

Fig. 10 is a cross-sectional view as seen by looking in the direction of the arrows 10—10 in Fig. 8;

Fig. 11 is a cross-sectional view of Fig. 8, taken along the line 11—11 of the latter;

Figs. 12 and 13 are plan views of a pair of complementary clamping plates or holders used in connection with the manufacture of the implement of my invention;

Figs. 14, 15, 16 and 17 are fragmentary cross-sectional views of the clamping plates of Figs. 12 and 13, taken, respectively, along the lines indicated by the arrows 14—14, 15—15, 16—16 and 17—17, of the latter;

Fig. 18 is an end elevational view of the clamping plates shown in Figs. 12 and 13, and illustrates the latter bolted together to maintain between them a multiplicity of the sheet metal blanks during one of the method steps in the development of the implement of my invention;

Fig. 19 is a view similar to Fig. 8, and illustrates a part of the implement blank at a certain stage of its development;

Figs. 20, 21 and 22 are fragmentary cross-sectional views of Fig. 19, taken substantially as indicated by the arrows 20—20, 21—21 and 22—22 of the latter;

Figs. 23 and 24 are, respectively, front and side elevational views of certain parts of a fixture used in carrying out some of the steps in the manufacture of the implement of my invention;

Figs. 25 and 26 are fragmentary cross-sectional views, taken substantially as indicated by the arrows 25 and 26—25 and 26, on Fig. 19, and illustrate certain steps in the development of the axe cutting edge of the implement of my invention;

Figs. 27, 28 and 29 are similar views of the end of the implement of my invention provided with a handle and guard, and illustrate various steps in the development of the same;

Fig. 30 is a plan view of the implement of my invention;

Fig. 31 is an edge view of the implement shown in Fig. 30;

Fig. 32 is a perspective view, on an enlarged scale, of one of disc members comprising the handle of the implement of Fig. 30;

Fig. 33 is a perspective view of a tool used in conjunction with the manufacture of the hand grip member of the implement illustrated in Fig. 30;

Fig. 34 is a plan view of a modified form of hand grip member;

Fig. 35 is a view similar to Fig. 9, and illustrates a modified form of construction;

Fig. 36 is a view similar to Fig. 20 and illustrates a further step in the development of the modified form of construction shown in Fig. 35;

Fig. 37 is a view similar to Fig. 9, and illustrates another modified form of construction;

Fig. 38 is a view similar to Fig. 20 and illustrates a further step in the development of the modified form of construction shown in Fig. 37;

Figs. 39 and 42 illustrate, respectively, two different forms of reinforcing means associated with the handle tang of the implement of my invention;

Figs. 40 and 41 are cross-sectional views, respectively taken as indicated by the arrows 40—40 and 41—41 on Figs. 39 and 42.

As previously noted, my invention involves both an implement and a method of making the same. Since a thorough understanding of the elements comprising the implement is more or less dependent upon a knowledge of their characteristics derived in accordance with the method, the description will consequently be proceeded with by first, briefly referring to the more essential elements comprising the implement, second, explaining the method of producing the implement, and third, indicating the various functions, uses and salient features of the completed implement.

Accordingly, attention is first invited to Figs. 30 and 31 of the drawings, which depict one practical and illustrative embodiment of the implement of my invention, obtained by following my new method of manufacture.

In general, the implement comprises a substantially L-shaped body 50 of uniform thickness, having at one end a hand grip member 51, and hand guard 52. At the other end of the body 50 is provided an integral lateral extension 52 in which is formed an offset relatively thinner cutting blade section 53 of substantially crescent-shaped configuration having a chisel cutting edge 54. The outer end of the latter is protected by a rounded portion of a rim, or reinforcing structure 55, cooperatively associated with the blade section 53. Along one side of the body 50 is provided a long axe cutting edge 56, the outer, or lower end of which is protected by a blunt tip or nose 57. The bottom edge of the body 50 is provided with an outwardly reduced or inclined section 58, arranged to facilitate the use of this edge in ground digging operations, as later on explained. A finger, or hand-edge notch 59, is provided in the body 50, to permit grasping the body with the left hand in conjunction with the said ground digging operations, and functions to prevent slipping of the hand into contact with the cutting edge 54.

As hereinafter more particularly explained, the referred to elements of my implement are constructed, combined and cooperatively associated to provide advantages not attainable with the devices of the prior art. To make this more apparent, it is desirable to next consider the structural and functional characteristics of these elements resulting from the following method of manufacturing the implement, the various phases of which are illustrated by Figs. 1 to 29 inclusive:

To facilitate production of the implement at comparatively low cost, and embody therein certain desirable and advantageous features, the implement is developed from a piece of standard hot, or cold rolled steel, of uniform thickness and high manganese content, indicated by the reference numeral 61 in Figs. 1, 2 and 3. The thickness of this steel is about one-eighth inch.

A blank form, as generally indicated by the numeral 62 in Fig. 4, is stamped from such steel.

If it is desired to produce such blanks in quantity, they may, of course, be stamped from plates or sheets of suitable shape and size, as exemplified by Fig. 1, which permit blanking of the forms 62 without entailing excessive waste material.

By comparing the blank 62 of Fig. 4, with the finished implement of Fig. 30, it will be seen that the general outline of the blank remains the same throughout the various steps of manufacture of the implement, and consequently, that the general shape of the implement is substantially attained right at the start.

In proceeding with the description of the development of the implement from this point, it will be necessary to refer to the parts already identified in their finished state in Figs. 30 and 31. Therefore, in their unfinished state, these parts will be identified by the same reference numerals but with the exponent a added thereto. The elements not previously designated will be identified by different reference numerals.

Turning again to the blank 62 of Fig. 4, it is to be noted that the same has an integral handle tang 63 formed at its handle, or upper end, and an integral lateral extension 52ª at its opposite, or lower end. The extension 54ª is so arranged that its upper face edge curve 64 (later defining the chisel cutting edge 54) lies crosswise of a line 65 forming a direct projection or continuation of the longitudinal median line of the handle tang 63. The edge curve 64 is furthermore so located that a tangential line 66, at a point substantially centrally of the edge curve 64, is at right angles with the projected handle tang median line 65.

Proceeding with the development of the blank 62, and referring now to Figs. 5, 6 and 7, the edges 56ª and 58ª are next shaped as shown in these figures, by grinding away the metal with a suitable rotary grinding wheel. The edge 58ª can be readily shaped in conformity with the cross-sec tion of Fig. 6, by manually manipulating the blank 62 during the grinding operation. However, I have found it expedient to utilize a special grinding fixture of the type shown in Figs. 23 and 24, to attain precise uniformity in effecting the cross-sectional double slope, or convergence, of the long side edge 56a, shown on an enlarged scale in Fig. 7.

The said fixture generally comprises a bracket 77, which is fixed to the ceiling, or otherwise rigidly mounted in an elevated position, and a frame 78, which is suspended from the bracket by a vertically adjustable universal joint 79. In the main, the frame 78 is constructed of standard angle metal, braced by flat cross members, or plates, indicated by the numerals 71 and 72. The lower end of the frame 78 is provided with means for determinedly holding one of the blanks 62 in the manner illustrated.

The said blank holding means includes a plate 80, which is fixed to the lower end of the right leg of the frame 78, and has a top edge 81 adapted to seat and position the lateral extension 52a of the blank 62 in determined position relative to a grinding wheel 91, and two clamps, arranged to quickly secure the blank in, and release it from, this determined position. One of these clamps comprises a screw stud 82, fixed in the lower end of the left leg of the frame 78, and positioned to form a rest for the tang 63 of the blank 62, a clamp plate 83, and a wing nut 84 mounted on the threaded portion of the stud 82 in such manner as to move the plate 83 against the tang 63, and the latter against the leg of frame 78. The second clamp comprises a screw stud 85, fixedly mounted in the lower right leg of frame 78, a clamp plate 86, and a wing nut 87, arranged in similar manner to the corresponding parts of the first clamp, but positioned to cooperatively hold the lower edge of the blank 62 in the position shown in Fig. 23. In connection with the latter clamp means, a leaf spring 88 is provided between the plate 86 and the blank 62, to facilitate the opening action of this clamping arrangement.

The grinding wheel 91 is power driven, and is so positioned that grinding contact between the blank edge 56a and the wheel 91 will result at the desired angle of inclination to effect the edge slope, as shown in Fig. 7.

Adjustable stop studs 92 and 93, on the frame 78, cooperate with fixed abutments 94 and 95, to limit the lateral swinging movement of the frame 78, when the latter is manipulated to effect the grinding of the edge 56a of the blank 62. The abutments 94 and 95 constitute extensions of brackets 96 and 97, mounted on a stationary support or beam 98.

A guard 99 is arranged along the lower front portion of the grinding wheel 91, and secured to the brackets 96 and 97. Another guard 101 extends across the upper part of the wheel and is mounted in this position by attachment to means, not shown.

Fig. 23 shows that the curvature of the arc along which the edge 56a moves when the frame 78 is being reciprocated during the grinding operation, coincides with the curvature of the edge 56a. It will be realized, therefore, that the distance from the swinging center C of the frame 78, of the edge 56a, equals the radius of the curve forming this edge of the blank 62. In the present instance, this distance and radius is forty-two inches.

Since the frame 78 is suspended from the universal joint 79, it will be understood that when the grinding operation has been performed on one side edge 56a of the blank 62, as described, the frame 78 can be readily swung in a direction away from the wheel 91, a sufficient distance to permit its rotation through an angle of 180 degrees, so as to bring the unground side edge of the blank into proper position for grinding, as before.

In order to maintain the same grinding angle, and allow for wear of the grinding wheel 91, the diminishing radius of the latter is compensated for by periodically adjusting the frame 78 relative to the grinding wheel. For this purpose, the supporting bracket 77 is provided with a series of relatively spaced adjustment apertures 102, arranged to permit vertical adjustment of a screw stud 103, the forward end of which carries the universal joint 79.

To permit finer vertical adjustments to be made, the frame 78 is connected with the universal joint 79 by a screw threaded member 104. This member extends through an apertured boss 105, centrally located at the upper end of the frame 78. By means of two clamp nuts 106 and 107, arranged on the member 104, above and below the boss 105 vertical micrometer adjustments of the frame 78, can be attained.

Before or after shaping the edges 56a and 58a, as just described, an aperture 108 is punched, or drilled through the handle tang 73 to facilitate suspension of the blank 62 from a wire or other suitable means, in connection with the hardening process to which the blank is later subjected.

Figs. 8, 9, 10 and 11, illustrate the initial steps of forming the unique cutting blade section (identified by the numeral 53 in Figs. 30 and 31), in the lateral extension 52a of the blank 62. By means of a suitable die (not shown) a crescent-shaped portion 53a of the extension 52a, is depressed so as to form a section the surfaces of which are in parallel, but laterally offset planer relation, with the surfaces of the body 50a of the blank. Simultaneously with this embossing operation, the free edge of the portion 53a is bent outwardly to form a lip 54a. By depressing the portion 53a, the metal at the line of juncture of this portion with the contiguous blank area, forms a reinforcing edge structure. Formation of the section 53a also creates a curved rim element 55a which, at the time of forming the section 53a and lip 54a, is bent downwardly in such manner that its top surface gradually slopes from the region of the upper arrow 11 of Fig. 8, to a point 113, and then more abruptly to a point of mergence 114 with the lip 54a. The operations just described are preferably performed simultaneously by a single die, but this is not essential since the same result can be accomplished in progressive steps, if desired.

The blank 62, as formed up to this point, is then hardened. This is accomplished by heating the blank from 1400 to 1500 degrees Fahrenheit, depending upon the characteristics of the steel comprising the blank, after which the blank is quenched in oil to effect a hardness of about 52 to 60 Rockwell C.

The heating medium in which the blank 62 is immersed during the heating process may be salt, air, or some other well known fluid adapted for this purpose, and with the aid of which the desired heating can be accomplished without scaling of the metal.

After quenching, the blank 62 is air cooled, and if the heating medium utilized was salt, the blank is washed in boiling water to remove therefrom any salt particles adhering thereto after quenching.

In connection with the tempering process, I have found it desirable to employ a device arranged to simultaneously straighten the blank 62, and release any stress in the metal thereof. This device comprises a pair of complementary rigid metallic clamp plates 118 and 119, as shown in Figs. 12 and 13. The plate 119 is provided with a depression 121, corresponding in shape and size with the embossed portion 53ᵃ and lip 54ᵃ of the blank 62; and the plate 118 is provided with a projection 122 of similar configuration. By placing a blank 62 between these two plates so that the depression 121 and projection 122 are in opposition with the portion 53ᵃ and lip 54ᵃ, both surfaces of the blank will be contactingly engaged by the inner faces of the plates 118 and 119 throughout their entire extent.

Of course, if desired, a multiplicity of the blanks 62 can be stacked together in superimposed and interfitting relationship, and the entire stack placed between the plates 118 and 119, as shown in Fig. 18. The blank straightening and pressing action exerted by the plates 118 and 119, will be the same in either case.

Any suitable means may be utilized to effect aligned movement of the plates 118 and 119 toward each other until a desired pressure is exerted on the blank or blanks 62. In the present instance, I employ for this purpose a plurality of bolts 120, the threaded shanks of which extend through a balanced arrangement of aligned apertures 123 and 124 in the plates 118 and 119, and nuts 125 cooperatively associated with the bolts 120 to effect the desired plate movement and pressure action.

The plates 118 and 119 are also provided with apertures 126 and 127 which register with each other when the plates are bolted face to face, as shown in Fig. 18. A wire or other suitable suspension means for the clamp unit shown in Fig. 18, may be anchored in apertures 126 and 127, and the said unit then hung in a heating medium, such as liquid salt, to raise the temperature of the blanks 62 to a temperature of about 700 to 750 degrees Fahrenheit.

After maintaining the temperature of the blanks 62 at this point for about twenty minutes, the clamp unit is removed from the heating medium and the bolts 120 tightened to bring about maximum attainable straightening and nesting of the blanks 62, so as to release any stresses existent in the metal of the blanks.

The clamp unit is then again placed in the heating medium and continuously maintained at a temperature of about 700 to 750 degrees Fahrenheit for about one hour, after which the unit is removed from the heating medium and the blanks 62 permitted to slowly cool in air.

After cooling, the blanks will have attained a hardness of about 47 Rockwell C.

In order that the handle tang 63 will have a desirable amount of ductility, and its outer tip 130 and the shoulders 128 may be in condition for later peening or riveting, the tang 63 and a contiguous portion of the blank body 50ᵃ of about one inch below the tang, is reheated in a heating medium, such as liquid salt, to a temperature of about 1300 degrees Fahrenheit and then slowly air cooled. This annealing process will reduce the hardness of the tang and referred to associated parts to approximately 30 Rockwell C.

To give the blank 62 a desirable black surface appearance or color, after tempering, the blank is first thoroughly cleaned by pickling, sand blasting, or in other well known manner, and then immersed in a coloring bath consisting of a mixture of water and coloring chemical heated to a temperature of about 300 degrees Fahrenheit. When the blank has attained the desired color, it is quenched in cold water, then washed in hot water, and thereafter dipped in paraffin so as to provide it with a protective anti-rust film or coat.

After tempering the blank 62, another shaping operation is performed on its partly completed side edge 56ᵃ with the aid of a fixture similar to that shown in Figs. 23 and 24. By means of a suitable grinding wheel the said edge is reduced as shown at 116 and 117 in Fig. 25. This facilitates the final shaping and polishing of the edge.

The blank 62 is now ready for its final shaping and polishing operations. These include converting the crescent-shaped section 53ᵃ into a cutting blade of one-half the thickness of the blank body 50ᵃ, and the lip 54ᵃ into a chisel edge. This is accomplished simultaneously by wet grinding away the metal below the dot-and-dash line G in Figs. 9, 10 and 11, by means of a flat grinding surface operating on the metal in a plane parallel to the flat surfaces of the blank 62.

Figs. 19, 20, 21 and 22 illustrate the appearance of the parts shown in Figs. 8, 9, 10 and 11, after the said grinding operation has been performed.

By means of a fine grinding wheel, the long side edge 56ᵃ of the blank 62 is next shaped to form an axe edge as illustrated in Fig. 26.

This is followed by polishing, in the manner and by means well understood in the art, of the axe edge 56ᵃ, the upper inclined surface of the chisel edge 54ᵃ, and the under surface 131 of the crescent-shaped section 53ᵃ.

The blank 62 has now attained its finished form, in readiness for attachment thereto of a hand grip member and hand guard as illustrated in Figs. 27, 28, 29 and 32.

The hand guard member 52ᵃ consists of a flat tough steel strap, originally shaped as shown in Fig. 27, having a centrally located longitudinally extending slot 132 arranged to permit fitting the guard in the position shown in Fig. 27, with the tang shoulders 128 slightly projecting beyond the strap. By peening or riveting the said projecting ends of the shoulders 128 so as to overlap the strap adjacent the edge of the slot 132, the guard 52ᵃ will be securely held in place at this point.

To provide a tight fitting solid handle grip member 51ᵃ on the handle tang 73, the member 51ᵃ is constructed of discs 133 illustrated in Fig. 32. These discs may be formed of leather, or other similar material, and are provided with a centrally located slot 134 of such dimension as to snugly embrace the tang 73. Due to this snug fit, it becomes necessary to force the discs 133 into the tang 73 and for this purpose I utilize a special tool 135 shown in Fig. 33. This tool consists of an oval-shaped tubular part 136, having a longitudinally extending opening of a cross-sectional shape and size slightly larger than the tang 73. By placing one of the discs 133 on the handle tang 73, and then slipping the open end of the part 136 of the tool 135 over the tang 63, the disc can be pushed or rammed home. If necessary, the end 137 of the tool 135 may be tapped with a hammer. This disc applying operation is repeated until a sufficient number of discs 133 have been applied to the tang 73 to cover the latter from the shoulders 128 to the outer tang end as shown in Fig. 28. Thereafter, a slot 138, in the guard 52ᵃ, is placed into engagement with the reduced tip 130 of the tang and the latter riveted over as shown in Fig. 29 to form a smooth rivet head over the guard at this point and thereby securely hold it in position on the tang.

The hand grip 51ª, as illustrated in Fig. 29, is then refined by a final shaping process involving the grinding away of a sufficient amount of the disc material at 141, 142 and 143 (Fig. 29) to form a smooth forefinger notch 144, a smoothly rounded pivot edge 145 for the little finger and side edge of the hand, and a smoothly rounded part 146 for free and easy cooperation with the palm of the hand, as illustrated in Fig. 30.

Figs. 34 to 42 inclusive show various modifications coming within the purview of my invention.

Fig. 34 illustrates a solid preformed hand grip member 147, having a central longitudinally extending aperture 148 of such cross-sectional configuration as to permit sliding the member over the handle tang to a position occupied by the disc members 133, as previously described. The member 147 may be preformed of hard rubber, or other synthetic or natural material suitable for this purpose.

Figs. 35 and 36 illustrate a modification of the construction shown in Figs. 9 and 20, and the corresponding parts are consequently identified by the same numerals as in the latter figures having the exponent b added thereto. In this instance the steel comprising the body 50ᵇ is only one-half the thickness of that from which the implement of Fig. 9 is formed, and the step of displacing the metal to form the crescent-shaped portion of the latter figure is omitted. However, a lip 54ᵇ is formed as before, and the lower part thereof, to the dot-and-dash line Gᵇ, is ground away to thereby obtain a chisel edge of the same construction as that shown in Fig. 9, but, of course, of only one-half the thickness.

Figs. 37 and 38 illustrate another modification of the construction shown in Figs. 9 and 20, and the corresponding parts are consequently designated by the same numerals having the exponent "c" added thereto. In this instance the blade section 53ᶜ corresponds exactly to that shown in Figs. 9 and 20. However, here again the steel from which the implement is formed is one-half the thickness of that shown in Figs. 9 and 20, so that the grinding operation which removes the metal to the dot-and-dash line Gᶜ, will result in creating the chisel-edge 54ᶜ without effecting the section 53ᶜ.

It is, of course, to be understood that with respect to the modifications of Figs. 35, 36, 37 and 38, the implement of my invention is otherwise the same as that previously described, and that the method of producing the same is also altered only to the extent described in effecting the changes comprising the said modifications.

If it is desired to reinforce the handle tang 63 at and adjacent to its point of juncture with the body portion of the implement, one or more ribs 149 are formed in this area, as illustrated in Figs. 39 and 40.

To reinforce the entire handle tang 73 and a contiguous portion of the body of the implement, a separate reinforcing plate 150 is combined with the tang 73, as shown in Figs. 41 and 42. This reinforcing plate is attached to the adjacent parts of the implement blank by spot welding, indicated at 151, or by other well known means.

Of course, it is to be understood that my invention is not limited to the implement and method specifically shown and described, and that various changes and modifications are possible without departing from the invention herein disclosed, as more particularly indicated by the scope of the appended claims.

As previously pointed out, the implement of my invention comprises various structural and functional features which are unique and advantageous. To make this more apparent, attention is again invited to Figs. 30 and 31, in conjunction with the following explanation of how the constituent parts of the implement function in practical use:

The long axe-shaped cutting edge 56 is adapted and arranged to effect a long sweeping cut desirable in connection with the removal of brush, vines, briars and trees up to sizes necessitating the use of a cross-cut saw or a double bitted axe.

The blunt part or nose 57 protects the long cutting edge 56 when the implement inadvertently strikes the ground, or some other object, as the result of a chopping stroke.

The relatively thinner crescent-shaped blade section 53 is adapted to enable efficient cutting of objects located in places of difficult access, as among rocks, stones, stumps, near guy wires, abutments, foundations, walls and similar obstacles. Since the chisel cutting edge of this blade section lies crosswise of the extended median line of the handle tang of the implement, straight-arm pulling force on the handle of the latter can be exerted to any extent without developing any lateral movement of the blade during its cutting action. It is also to be noted that the thin cutting blade section 53 is reinforced and stiffened against cutting strains by the curved rib-like structure extending along the line of juncture of the blade section with the body of the implement. Furthermore, that the rim member 55 likewise reinforces the outer portion of the cutting blade section 53, and that the inwardly curved extremity of this rim member functions to protect the cutter end of the chisel edge 54 against damage.

The hand grip member 51 and hand guard 52 are designed to permit use of the natural momentum of the implement when the latter is swung with full force to effect cutting with the edge 56. This arrangement also enables pivoting the implement around the little finger of the hand at 145, with the rounded part 146 of the grip moving freely within the hand.

The implement can be readily used for digging trenches, or for other emergency digging operations, by employing for this purpose the lower end of the implement having a partly sharpened or tapered edge 58. By reversing the implement as shown in Fig. 30 so that the plain edge with notch 59 is positioned at the top, this edge can be conveniently grasped with the left hand in such manner that the little finger thereof rests in the said notch. The right hand can then be applied at the grip 51 to exert the necessary power or push in carrying out a shoveling motion or stroke, while this action is being guided by the left hand. During this procedure the notch 59 serves to prevent slippage of the left hand into contact with the chisel edge 54.

For further amplification of the various features, advantages, uses, etc., of the herein disclosed implement of my invention, reference may be had to two booklets copyrighted in 1942 by the Victor Tool Co. of Reading, Pa., and distributed by the latter. These booklets are entitled as follows:

1. Fighting with U. S. A. Knife LC-14-B.

2. Care, Use and Sharpening of Knife LC-14-B.

I claim:

1. An implement of the character described comprising a substantially L-shaped body including a lateral extension at one end thereof, a handle tang at the other end of the body which is inclined sidewise relative to the latter, hand gripping means associated with said tang, and a cutting edge on said extension having a portion thereof arranged crosswise of the median line of the handle tang.

2. An implement of the character described comprising a substantially L-shaped body including a lateral extension at one end thereof, a handle tang at the other end of the body which is inclined sidewise relative to the latter, hand gripping means associated with said tang, and a cutting edge on said extension having a portion thereof arranged crosswise of the median line of the handle tang so as to effect a right-angular cross-cutting action when the implement is moved along said line.

3. An implement of the character described comprising a substantially L-shaped body including a lateral extension at one end thereof, a handle tang at the other end of the body which is inclined sidewise relative to the latter, hand gripping means associated with said tang, and a cutting edge on said extension having a portion thereof arranged crosswise of the median line of the handle tang so as to effect a right-angular cross-cutting action when the implement is moved along said line in the direction of said handle.

4. An implement of the character described comprising a substantially L-shaped sheet metal body including a lateral extension at one end thereof, a handle tang at the other end of the body which is inclined sidewise relative to the latter, hand gripping means associated with said tang, and a cutting edge on said extension having a portion thereof arranged crosswise of the median line of the handle tang.

5. An implement of the character described comprising a substantially L-shaped body including a relatively lateral extension at one end thereof, a handle tang at the other end of the body which is inclined sidewise relative to the latter, hand gripping means associated with said tang, and a cutting section on said extension of uniform and less thickness than the body, which section is provided with a cutting edge having a portion thereof arranged crosswise of the median line of the handle tang.

6. An implement of the character described comprising a substantially L-shaped body including an integral handle tang at one end and a relatively short lateral extension at its other end, hand gripping means associated with said tang, and a cutting blade on said extension arranged in parallel laterally offset planar relationship relatively to the latter, which section is provided with a cutting edge having a portion thereof arranged crosswise of the median line of the handle tang.

7. An implement of the character described comprising a substantially L-shaped body including an integral handle tang at one end and a relatively short lateral extension at its other end, hand gripping means associated with said tang, and a cutting blade on said extension of less thickness than the body and arranged in parallel laterally offest planar relationship with respect thereto, which section is provided with a cutting edge having a portion thereof arranged crosswise of the median line of the handle tang.

8. An implement of the character described comprising a substantially L-shaped body including an integral handle tang at one end and a relatively short lateral extension at its other end, hand gripping means associated with said tang, and a crescent-shaped cutting blade on said extension of less thickness than the body and arranged in parallel laterally offset planar relationship with respect thereto, which blade is provided with a cutting edge having a portion thereof arranged crosswise of the median line of the handle tang.

9. An implement blank of the character described comprising a substantially L-shaped sheet metal body including a lateral extension at one end thereof, a handle tang at the other end of the body which is inclined sidewise relative to the latter, and an edge portion of said extension arranged crosswise of the median line of the handle tang.

10. A developed implement blank of the character described comprising a substantially L-shaped body including a lateral extension at one end thereof, a handle tang at the other end of the body which is inclined sidewise relative to the latter, a cutting edge along one side of said body, and a cutting edge on said extension having a portion thereof arranged crosswise of the median line of the handle tang.

11. A developed implement blank of the character described comprising a substantially L-shaped body including a lateral extension at one end thereof, a handle tang at the other end of the body which is inclined sidewise relative to the latter, a cutting edge along one side of said body, a blunt nose portion at the corner of the body opposite to the handle tang, and a cutting edge on said extension having a portion thereof arranged crosswise of the median line of the handle tang.

12. A developed implement blank of the character described comprising a substantially L-shaped body including an integral handle tang at one end and a relatively short lateral extension at its other end, a cutting edge on said extension having a portion thereof arranged crosswise of the median line of the handle tang, an inclined edge section along the edge of the implement blank opposite to the handle tang, and a finger notch in the side edge of the body.

13. A developed implement blank of the character described comprising a substantially L-shaped body including an integral handle tang at one end and a relatively short lateral extension at its other end, reinforcing means arranged to resist lateral bending action of the handle tang, a cutting edge along one side of said body, a crescent-shaped cutting blade on said extension of less thickness than the body and arranged in parallel laterally offset planar relationship with respect thereto, which blade is provided with a cutting edge having a portion thereof arranged crosswise of the median line of the handle tang, and inclined edge section along the end of the blank opposite to the handle tang, and a finger notch in the edge of the body opposite to the side having a cutting edge.

14. The method of making an implement of the character described comprising the formation from sheet metal of uniform thickness of a blank substantially L-shaped in configuration having a handle tang at one end and a relatively short lateral extension at its other end, displacing an edge section of said extension so as to form a lip of uniform width and angular inclination beyond the plane of said blank with a portion thereof arranged cross-wise of the median line of the tang, hardening the blank, tempering the blank, reducing the lip so that the latter has a chisel edge, and uniting with said tang means forming a hand gripping member.

15. The method of making an implement of the character described comprising the formation from sheet metal of uniform thickness of a blank substantially L-shaped in configuration having a handle tang at one end and a relatively short lateral extension at its other end, effecting a substantially crescent-shaped displaced part of uniform thickness adjacent one edge of said extension arranged so that a tangential line at a point substantially centrally of the ends of the edge curve thereof is substantially at right angles with the median line of the handle tang, displacing the edge section of said part so as to form a lip of uniform width and angular inclination beyond the plane of said part, hardening the blank, tempering the blank, reducing the lip so that the latter has a chisel edge, and uniting with said tang means forming a hand gripping member.

16. The method of making an implement of the character described comprising the formation from sheet metal of uniform thickness of a blank substantially L-shaped in configuration having a handle tang at one end and a relatively short lateral extension at its other end, effecting a substantially crescent-shaped displaced part of uniform thickness adjacent one edge of said extension arranged so that a tangential line at a point substantially centrally of the ends of the edge curve thereof is substantially at right angles with the median line of the handle tang, displacing the edge section of said part so as to form a lip of uniform width and angular inclination beyond the plane of said part, hardening the blank, tempering the blank, reducing the said lip and part so that the latter constitute a chisel-edge cutting blade of less thickness than the main portion of the blank, and uniting with said tang means forming a hand gripping member.

17. The method of making an implement of the character described comprising the formation from sheet metal of uniform thickness of a blank substantially L-shaped in configuration having a handle tang at one end and a relatively short lateral extension at its other end, forming an axe edge along one of the sides of the blank, effecting a substantially crescent-shaped displaced part of uniform thickness in said extension arranged so that a tangential line at a point substantially centrally of the ends of the edge curve thereof is substantially at right angles with the median line of the handle tang, displacing the edge section of said part so as to form a lip of uniform width and angular inclination beyond the plane of said part, hardening the blank, tempering the blank, reducing said lip and part so that the latter constitutes a chisel-edged cutting blade of less thickness than the main portion of the blank, and uniting with said tang means forming a hand gripping member.

18. The method of making an implement of the character described comprising the formation from sheet metal of uniform thickness of a blank substantially L-shaped in configuration having a handle tang at one end and a relatively short lateral extension at its other end, reinforcing the handle tang against lateral bending action, effecting a substantially crescent-shaped displaced part of uniform thickness adjacent one edge of said extension arranged so that a tangential line at a point substantially centrally of the ends of the edge curve thereof is substantially at right angles with the median line of the handle tang, displacing the edge section of said part so as to form a lip of uniform width and angular inclination beyond the plane of said part, hardening the blank, tempering the blank, reducing the said lip and part so that the latter constitutes a chisel-edged cutting blade of less thickness than the main portion of the blank, and uniting with said tang means forming a hand gripping member.

19. The method of making an implement of the character described comprising the formation from sheet metal of uniform thickness of a blank substantially L-shaped in configuration having a handle tang at one end and a relatively short lateral extension at its other end, forming an inclined edge section at the end of the blank opposite to the handle tang, providing a finger notch in a side edge of the blank, effecting a substantially crescent-shaped displaced part of uniform thickness adjacent one edge of said extension arranged so that a tangential line at a point substantially centrally of the ends of the edge curve thereof is substantially at right angles with the median line of the handle tang, displacing the edge section of said part so as to form a lip of uniform width and angular inclination beyond the plane of said part, hardening the blank, tempering the blank, reducing the said lip and part so that the latter constitutes a chisel-edged cutting blade of less thickness than the main portion of the blank, and uniting with said tang means forming a hand gripping member.

20. The method of making an implement of the character described comprising the formation from sheet metal of uniform thickness of a blank substantially L-shaped in configuration having a handle tang at one end and a relatively short lateral extension at its other end, reinforcing the handle tang against lateral bending action, forming an axe edge along one of the sides of the blank, forming an inclined edge section at the end of the blank opposite to the handle tang, providing a finger notch in the side edge of the blank opposite to that having the axe edge, effecting a substantially crescent-shaped displaced part of uniform thickness adjacent the one edge of said extension arranged so that a tangential line at a point substantially centrally of the ends of the edge curve thereof is substantially at right angles with the median line of the handle tang, displacing the edge section of said part so as to form a lip of uniform width and angular inclination beyond the plane of said part, hardening the blank, tempering the blank, reducing the said lip and part so that the latter constitutes a chisel-edged cutting blade of less thickness than the main portion of the blank, and uniting with said tang means forming a hand gripping member.

FREDERICK EHRSAM.

CERTIFICATE OF CORRECTION.

Patent No. 2,335,497.                                            November 30, 1943.

FREDERICK EHRSAM.

It is hereby certified that error appears in the printed specification of the above numbered patent requiring correction as follows: Page 2, second column, line 62, for the word "face" read --free--; page 4, second column, line 58, for "into" read --unto--; page 6, first column, line 47, claim 5, strike out "relatively"; and second column, line 66, claim 13, for "and" before "inclined" read --an--; page 7, first column, line 44-45, claim 16, for "chisel-edge" read --chisel-edged--; and that the said Letters Patent should be read with this correction therein that the same may conform to the record of the case in the Patent Office.

Signed and sealed this 28th day of March, A. D. 1944.

Leslie Frazer (Seal)                                         Acting Commissioner of Patents.